(12) United States Patent
Sutter et al.

(10) Patent No.: US 12,472,517 B2
(45) Date of Patent: Nov. 18, 2025

(54) DENSE-PHASE POWDER PUMP FOR CONVEYING POWDER-TYPE MATERIALS

(71) Applicant: GEMA SWITZERLAND GMBH, St. Gallen (CH)

(72) Inventors: Erich Sutter, St. Gallen (CH); Marco Sanwald, Abtwil (CH)

(73) Assignee: GEMA SWITZERLAND GMBH, Gossau (CH)

( * ) Notice: Subject to any disclaimer, the term of this patent is extended or adjusted under 35 U.S.C. 154(b) by 161 days.

(21) Appl. No.: 18/577,950

(22) PCT Filed: Jul. 6, 2022

(86) PCT No.: PCT/EP2022/068800
§ 371 (c)(1),
(2) Date: Jan. 9, 2024

(87) PCT Pub. No.: WO2023/280948
PCT Pub. Date: Jan. 12, 2023

(65) Prior Publication Data
US 2024/0316582 A1    Sep. 26, 2024

(30) Foreign Application Priority Data

Jul. 9, 2021 (DE) ............ 10 2021 117 799.5

(51) Int. Cl.
*B65G 53/28* (2006.01)
*B05B 7/14* (2006.01)

(52) U.S. Cl.
CPC ............ *B05B 7/1459* (2013.01); *B65G 53/28* (2013.01)

(58) Field of Classification Search
None
See application file for complete search history.

(56) References Cited

U.S. PATENT DOCUMENTS 3,260,285 A * 7/1966 Vogt .................. B65B 1/16
53/436
6,283,680 B1 * 9/2001 Vidal .................. B65G 53/32
222/207
(Continued)

FOREIGN PATENT DOCUMENTS

DE    102005006522 B3    8/2006
DE    102011004035 A1    8/2012
(Continued)

OTHER PUBLICATIONS

First German Office Action dated Dec. 14, 2021, for corresponding German Application No. 102021117799.5.
(Continued)

*Primary Examiner* — Joseph A Dillon, Jr.
(74) *Attorney, Agent, or Firm* — Kinney & Lange, P.A.

(57) ABSTRACT

A dense-phase powder pump for conveying powder has at least one powder conveying chamber with a gas-permeable filter element that has at least regions thereof accommodated in a casing body and at least one pinch valve that is or can be connected to an end region of the powder conveying chamber. In particular, the dense-phase powder pump has a pinch valve housing formed as the end piece of the powder conveying chamber, which pinch valve housing has a first region facing the powder conveying chamber and an opposing second region, wherein the first region of the pinch valve housing is designed to be connectable to the end region of the powder conveying chamber by means of a plug connection, in particular a sole plug connection, and wherein the second region of the pinch valve housing is designed to exchangeably accommodate the pinch valve.

18 Claims, 5 Drawing Sheets

(56) References Cited

U.S. PATENT DOCUMENTS

| | | | | |
|---|---|---|---|---|
| 6,478,513 B1* | 11/2002 | Higuchi | | F04B 15/02 406/26 |
| 6,508,610 B2 | 1/2003 | Dietrich | | B65G 53/28 406/13 |
| 6,623,215 B2* | 9/2003 | Dietrich | | B05B 7/1459 406/197 |
| 6,648,558 B1* | 11/2003 | Shultz | | B65G 53/12 406/154 |
| 6,659,693 B1* | 12/2003 | Perkins | | B65G 51/24 406/13 |
| 7,144,213 B2* | 12/2006 | Cartwright | | G01F 3/20 414/217 |
| 7,150,585 B2* | 12/2006 | Kleineidam | | B65G 53/28 406/146 |
| 7,163,359 B2* | 1/2007 | Moser | | F04B 15/00 406/151 |
| 7,241,080 B2* | 7/2007 | Klobucar | | F04F 5/54 406/146 |
| 7,287,964 B2* | 10/2007 | Sanwald | | F04B 53/1057 417/397 |
| 7,410,329 B2* | 8/2008 | Simontacchi | | B65G 53/28 406/123 |
| 7,452,166 B2* | 11/2008 | von Keudell | | B65D 90/56 406/137 |
| 7,465,130 B2* | 12/2008 | Herre | | B05B 7/1459 406/50 |
| 7,648,312 B2* | 1/2010 | Kleineidam | | B05B 7/1459 406/146 |
| 7,740,423 B2* | 6/2010 | Newbolt | | F16K 51/02 406/14 |
| 8,057,129 B2* | 11/2011 | Kleineidam | | B65G 53/28 406/146 |
| 8,231,310 B2* | 7/2012 | Sanwald | | B05B 7/1459 406/146 |
| 8,333,570 B2* | 12/2012 | Fulkerson | | F04F 5/48 417/86 |
| 8,491,226 B2* | 7/2013 | Kleineidam | | B05B 7/1459 406/146 |
| 8,491,227 B2* | 7/2013 | Fulkerson | | A01D 87/10 406/14 |
| 8,678,777 B2* | 3/2014 | Fulkerson | | F04F 5/48 417/86 |
| 8,790,048 B2* | 7/2014 | Furuyama | | B65G 53/40 406/50 |
| 8,801,340 B2* | 8/2014 | Berggren | | B65G 53/52 406/89 |
| 8,951,022 B2* | 2/2015 | Mauchle | | B05B 7/1459 417/187 |
| 9,085,065 B2* | 7/2015 | Reilley | | B24C 9/006 |
| 9,108,808 B2* | 8/2015 | Furuyama | | B01D 53/12 |
| 9,175,781 B2* | 11/2015 | Reilley | | B65G 53/40 |
| 9,181,045 B2* | 11/2015 | Reilley | | B65G 53/60 |
| 9,617,086 B2* | 4/2017 | Rusterholz | | B65G 51/02 |
| 9,834,391 B2* | 12/2017 | Mauchle | | G05D 7/012 |
| 11,009,424 B2* | 5/2021 | Beuk | | B05B 15/14 |
| 11,033,916 B2* | 6/2021 | Mauchle | | B05C 19/04 |
| 11,224,886 B2* | 1/2022 | Lutz | | B05B 7/1472 |
| 11,536,296 B2* | 12/2022 | Perillo | | F04B 39/10 |
| 11,543,038 B2* | 1/2023 | Fulkerson | | F04B 53/10 |
| 11,999,576 B2* | 6/2024 | Klose | | B65G 53/66 |
| 2001/0003568 A1* | 6/2001 | Dietrich | | B65G 53/28 406/151 |
| 2006/0193704 A1* | 8/2006 | Simontacchi | | B05B 7/1459 406/88 |
| 2007/0095945 A1* | 5/2007 | Keudell | | B65D 90/56 239/398 |
| 2008/0190359 A1* | 8/2008 | Mauchle | | B05B 7/1459 118/308 |
| 2008/0205999 A1* | 8/2008 | Rieger | | B05B 7/1459 406/96 |
| 2010/0255975 A1* | 10/2010 | Mauchle | | B04C 5/14 494/23 |
| 2010/0278597 A1* | 11/2010 | Borzone | | B65G 53/525 406/108 |
| 2012/0282398 A1* | 11/2012 | Fulkerson | | B05D 7/227 427/180 |
| 2014/0044578 A1* | 2/2014 | Sanwald | | B05B 7/1459 417/559 |
| 2016/0052000 A1* | 2/2016 | Mauchle | | B65G 53/30 118/308 |
| 2017/0052088 A1* | 2/2017 | Beuk | | F04B 51/00 |
| 2019/0293092 A1* | 9/2019 | Perillo | | F04B 7/0275 |
| 2021/0207721 A1* | 7/2021 | Fulkerson | | F04B 53/10 |
| 2022/0323977 A1* | 10/2022 | Mauchle | | B65G 53/28 |
| 2024/0286155 A1* | 8/2024 | Sanwald | | B65G 53/28 |
| 2024/0316582 A1* | 9/2024 | Sutter | | B05B 7/1459 |
| 2024/0316591 A1* | 9/2024 | Tobler | | B05C 11/1026 |

FOREIGN PATENT DOCUMENTS

| | | |
|---|---|---|
| DE | 102013211550 A1 | 12/2014 |
| DE | 102017103487 A1 | 8/2018 |
| EP | 1857384 A2 | 11/2007 |
| EP | 1895215 A2 | 3/2008 |
| WO | 2004087331 A1 | 10/2004 |

OTHER PUBLICATIONS

International Search Report and Written Opinion dated Nov. 7, 2022, for corresponding PCT Application No. PCT/EP2022/068800.

\* cited by examiner

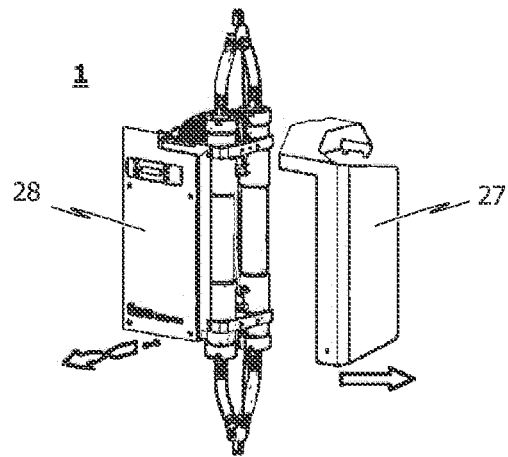 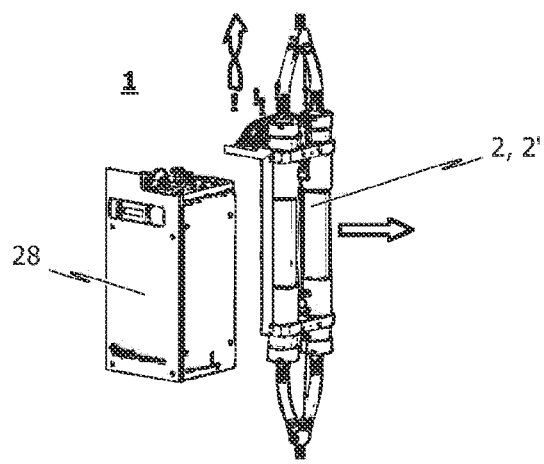
FIG. 4a    FIG. 4b
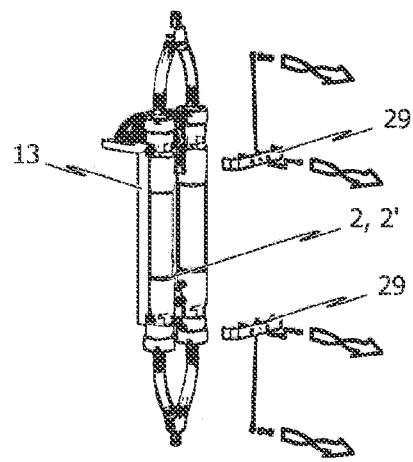 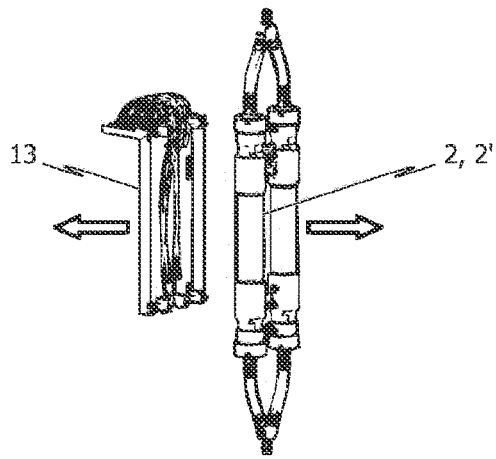
FIG. 4c    FIG. 4d

DENSE-PHASE POWDER PUMP FOR CONVEYING POWDER-TYPE MATERIALS

CROSS-REFERENCE TO RELATED APPLICATION(S)

This application is a U.S. National Stage Application of PCT International Application No. PCT/EP2022/068800, filed on Jul. 6, 2022, which claims priority to the German Patent Application No. 10 2021 117 799.5, filed on Jul. 9, 2021, which are incorporated herein by reference in their entireties.

BACKGROUND

The present disclosure relates to a dense phase powder pump.

Accordingly, the present disclosure relates in particular to a dense phase powder pump for conveying powdery materials/powder, particularly coating powder, wherein the dense phase powder pump comprises at least one powder conveying chamber having a (gas-permeable) filter element at least partially accommodated in a casing body or casing tube and at least one pinch valve connected or connectable to an end region of the powder conveying chamber.

In particular, the dense phase powder pump has a first pinch valve connected to the suction-side end region of the powder conveying chamber and a second pinch valve connected to the conveyance-side end region of the powder conveying chamber. The powder conveying chamber has at least one connection for alternately applying positive pressure and negative pressure to the powder conveying chamber.

The principle of such a dense phase powder pump is known from the prior art. For example, printed publication EP 1 551 558 A1 describes a dense phase powder pump having a first powder conveying chamber and a second powder conveying chamber arranged parallel to the first powder conveying chamber. The powder conveying chambers of the pump known from this prior art are limited on both the suction side as well as the conveyance side by a respective mechanically operated pinch valve arrangement.

It is thereby specifically provided for the powder hoses connected to the respective powder conveying chambers in the suction-side or conveyance-side region of the powder pump to be deformable by a mechanical force so as to squeeze or open the hose section as necessary. The powder conveying chambers of the pump known from this prior art comprise a gas-permeable filter element. A negative pressure is generated in the powder conveying chamber via a vacuum connection, in consequence of which coating powder is drawn into the powder conveying chamber via the suction-side end region of the powder conveying chamber. The pinch valve provided at the suction-side end region of the powder conveying chamber is then closed and the pinch valve provided at the conveyance-side end region of the powder conveying chamber is opened. When positive pressure is applied to the powder conveying chamber, the coating powder previously drawn into the powder conveying chamber is expelled again from the powder conveying chamber through the conveyance-side end region.

This known prior art powder pump exhibits various disadvantages in practical use. In particular, the design proposed in this prior art makes it relatively difficult to replace a potentially clogged filter element or defective pinch valve. The solution known from this prior art particularly does not allow a filter element to be replaced without disrupting the pinch valve assembly. There is thus a risk of leaks developing after maintenance or filter element replacement and the reliable functioning of the powder pump no longer being able to be guaranteed.

Other known prior art dense phase powder pumps of the aforementioned type also have the disadvantage of only being able to be maintained with relatively great effort. In particular, replacing the pinch valves of the known dense phase powder pumps is a relatively complex process.

On the basis of these problems, the present disclosure is thus based on the task of further developing a dense phase powder pump of the initially cited type such that it can be maintained with relatively little effort, whereby particularly a pinch valve of the dense phase powder pump and/or a gas-permeable filter element of the powder conveying chamber of the dense phase powder pump can be easily replaced without the risk of compromising the dense phase powder pump's functionality.

SUMMARY

Accordingly, the present disclosure relates in particular to a dense phase powder pump having a powder conveying chamber with a preferably cylindrical and in particular circular cylindrical casing tube or casing body and a gas-permeable filter element arranged inside said casing tube or casing body. The dense phase powder pump has at least one pinch valve connected or connectable to an end region of the powder conveying chamber.

The dense phase powder pump preferably comprises a first pinch valve connected to the suction-side end region of the powder conveying chamber and a further second pinch valve connected to the conveyance-side end region of the powder conveying chamber. The powder conveying chamber has at least one connection for alternately applying positive pressure and negative pressure to the powder conveying chamber.

Particularly provided according to the present disclosure is for the dense phase powder pump to comprise a pinch valve housing designed in particular as an end piece of the powder conveying chamber which has a first region facing the powder conveying chamber and an oppositely disposed second region. The first region of the pinch valve housing is designed to be connectable to the end region of the powder conveying chamber via a plug connection and preferably solely a plug connection. The second region of the pinch valve housing is designed to replaceably accommodate the pinch valve.

The advantages able to be attained with the disclosed solution are apparent: the provision of the pinch valve housing, which not only accommodates the pinch valve but also forms the transition between the powder conveying chamber and the pinch valve, enables the pinch valve to be fit onto the corresponding end region of the powder chamber such that the powder conveying chamber can be separated from the corresponding pinch valve—for example for maintenance purposes—by simply disengaging the plug connection. This thereby enables simply disconnecting the plug connection between the pinch valve housing and the powder conveying chamber in order to, for example, replace the gas-permeable filter element arranged within the casing body of the powder conveying chamber. The powder conveying chamber with the filter element accommodated in the casing body is then detached from the suction-side and conveyance-side pinch valve.

The pinch valve can likewise be easily removed from the end region of the powder conveying chamber as it has its own region (second region) of the pinch valve housing in which it is accommodated.

According to implementations of the disclosed dense phase powder pump, it is provided for the filter element to extend beyond the end region of the casing body at the end region of the powder chamber. It thereby makes sense for the first region of the pinch valve housing to be designed so as to accommodate the filter element region extending beyond the end region of the casing body.

In forming the plug connection between the pinch valve housing and the powder conveying chamber, embodiments of the disclosed dense phase powder pump provide for the first region of the pinch valve housing to comprise a first section facing the casing body and an oppositely disposed second section, wherein the first section of the pinch valve housing and the end region of the casing body of the powder conveying chamber are designed to form a disengageable plug connection between the pinch valve housing and the casing body.

Embodiments of the latter configuration of the disclosed dense phase powder pump provide for the first section of the pinch valve housing to be designed as a spigot for the connection at the end region of the casing body.

Alternatively thereto, however, it is also conceivable and preferential for the end region of the casing body to be designed as a spigot for the connection at the first section of the pinch valve housing.

Different types of plug connections can thereby be realized, in particular a slide ring connection, a lip seal, a compression seal or a compression lip seal.

At least one stop is advantageously provided which is designed to limit movement of the pinch valve housing relative to the casing body of the powder conveying chamber in the mating direction. Doing so enables a defined plug connection to be realized between the pinch valve housing and the powder conveying chamber.

It is conceivable in this context for the at least one stop to be formed by a first abutment surface formed at the end region of the casing body and a second abutment surface formed at the first region of the pinch valve housing. After the plug connection being made between the pinch valve housing and the end region of the powder conveying chamber, the second abutment surface is to preferably tightly seal against the first abutment surface.

In order to achieve a sealing effect when forming the plug connection between the pinch valve housing and the powder conveying chamber by plugging the two components together, it is in particular provided for elastic sealing means, preferably in the form of an O-ring, to be provided between the first section of the pinch valve housing and the end region of the casing body.

Preferential implementations of the disclosed dense phase powder pump provide for the second section of the pinch valve housing to be designed so as to accommodate a region of the filter element extending beyond the end region of the casing body. Elastic sealing means, preferably in the form of an O-ring, are to thereby be provided between the second section of the pinch valve housing and the region of the filter element extending beyond the end region of the casing body.

According to implementations of the disclosed dense phase powder pump, a releasable securing element, particularly in form of a retaining clip, is provided in order to releasably fix the pinch valve housing with the inserted powder conveying chamber to a mounting of the dense phase powder pump, and thus to releasably secure the plug connection between the pinch valve housing and the casing body of the powder conveying chamber. However, other solutions for the securing element are of course also conceivable.

According to preferential implementations of the disclosed dense phase powder pump, the pinch valve is implemented as a cartridge-like or canister-like component and comprises an at least partly tubular valve element, its peripheral wall able to be squeezed transversely to the valve element's longitudinal axis in order to change the sectional area of flow. Preferably, the pinch valve further comprises an in particular at least substantially tubular support structure in which the valve element is at least in part accommodated, in particular replaceably.

For example, the support structure can consist of a plurality of shell elements of arcuate cross section circumferentially aligned one after the other around the peripheral wall which are radially attached to the outside of the valve element with respect to the longitudinal axis of the valve element.

Providing such a support structure ensures that the valve element can be easily installed without compromising its retention. The assembly of the pinch valve produces a cartridge-like or canister-like structural unit, as a result of which there is no need for laboriously inserting the valve element into a support structure. Instead, the individual shell elements of the support structure can be radially attached to the tubular valve element from the outside in order to thereby form the circumferentially segmented support structure. The cartridge-like or canister-like structural unit composed of the shell elements and the valve element can be axially inserted into the second region of the valve housing and also removed again when needed.

The pinch valve can in particular be inserted into the second region of the pinch valve housing, wherein an in particular annular pressure chamber able to be pressurized with compressed air is formed between the pinch valve and an inner wall area of the second region of the pinch valve housing in the inserted state.

In this context, it makes sense for the pinch valve housing to have at least one compressed air connection through which compressed air can be supplied to the pressure chamber as necessary.

A corresponding stop is provided in order to limit movement of the pinch valve relative to the pinch valve housing, or second region of the pinch valve housing respectively, in the mating direction and to ensure a defined positioning of the pinch valve in the second region of the pinch valve housing. The stop is in particular formed by a first abutment surface of the pinch valve housing and a second abutment surface of the pinch valve. It is thereby advisable for the second abutment surface to preferably tightly seal against the first abutment surface in the inserted state of the pinch valve.

In order to be able to connect the second region of the pinch valve housing to a powder line, in particular a powder hose, implementations of the disclosed dense phase powder pump provide for an interface to be formed on an end section of the second region of the pinch valve housing opposite from the powder conveying chamber by means of which the second region of the pinch valve housing can be detachably connected to a powder line or a powder hose.

Particularly advisable is for the interface to be designed and implemented as a threaded section, and preferably an external threaded section, so as to receive for example a union nut in order to thereby detachably connect a hose connector to the second region of the pinch valve housing. However, other solutions are of course also conceivable.

According to embodiments of the disclosed dense phase powder pump, it is provided for the pinch valve housing to comprise a transition region formed between its first region and its second region which is designed to at least partly reduce an effective sectional area of flow of the powder conveying chamber, as dictated by the cross section of the powder conveying chamber's filter element, to an effective sectional area of flow of the pinch valve in its opened state. The transition region is thereby in particular at least in part implemented as a funnel-shaped or conical region.

This configuration of the disclosed dense phase powder pump can provide for the transition region of the pinch valve housing being designed so as to be able to at least partially accommodate an in particular at least partly conical gas-permeable filter end piece of the powder conveying chamber. Said filter end piece is in particular realized as a separate component from the filter element of the powder conveying chamber.

It thereby makes sense for the filter end piece to be able to be plugged/inserted into the transition region of the pinch valve housing by way of the second region of the pinch valve housing.

With respect to the latter embodiments, sealing means particularly in the form of O-rings are preferably provided such that when the filter end piece is accommodated and in particular in inserted state in the transition region of the pinch valve housing, it is sealed relative to the second region of the pinch valve housing and relative to an in particular annular gap area formed between the casing body and the filter element.

Alternatively or additionally thereto, implementations of the dense phase powder pump provide for an in particular annular gap area to be formed between an inner wall area of the transition region of the pinch valve housing and the filter end piece when the filter end piece is accommodated and in particular in inserted state in the transition region of the pinch valve housing, which can be pressurized with compressed air as necessary via a compressed air connection of the pinch valve housing, particularly so as to keep the end region of the powder conveying chamber free of powder deposits or to remove deposits of powder at the end region of the powder conveying chamber.

BRIEF DESCRIPTION OF THE DRAWINGS

The following will reference the accompanying drawings in describing an exemplary embodiment of the present disclosure in greater detail.

Shown are:

FIGS. 4*a* to 4*h* a schematic view of the process for dismantling or respectively changing the pinch valves and filter elements of the dense phase powder pump according to FIG. 1.

DETAILED DESCRIPTION

Figure 1:
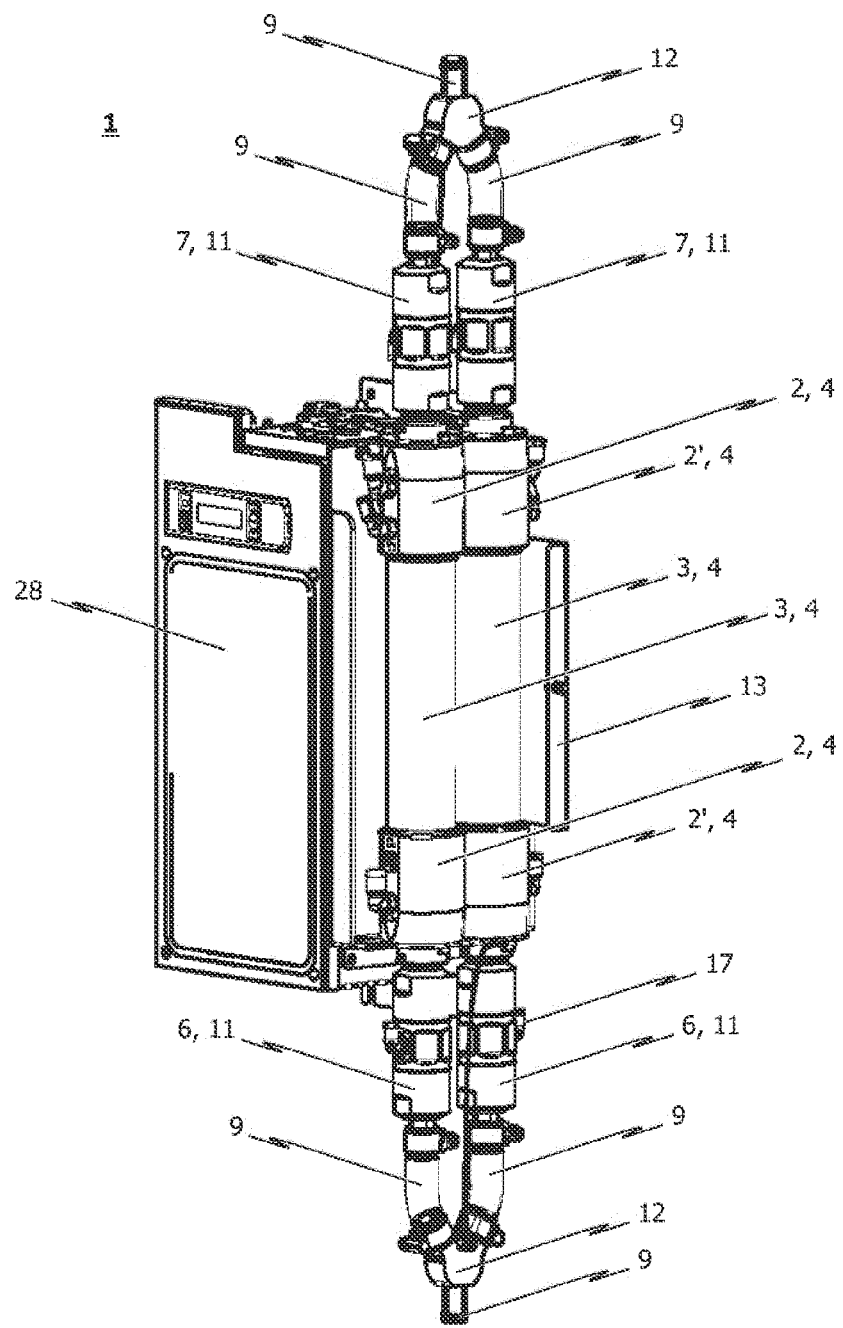
FIG. 1 a schematic and isometric view of an exemplary embodiment of the disclosed dense phase powder pump having two parallelly arranged powder conveying chambers.

The following will reference the drawings in describing the structure and mode of operation of a dense phase powder pump 1 according to an exemplary embodiment of the present disclosure. The exemplary embodiment of the disclosed dense phase powder pump 1 makes use of two powder conveying chambers 2, 2' arranged parallel to one another.

Each of the two parallelly arranged powder conveying chambers 2, 2' exhibits an in particular cylindrical main body region 3 having an at least substantially uniform effective sectional area of flow. Each particularly cylindrical main body region 3 of the two powder conveying chambers 2, 2' has a cylindrical, in particular circular cylindrical, casing tube 4 (or respectively casing body 4) and a filter element 5 accommodated in the interior of the casing tube 4. The filter element 5 of the main body region 3 of the powder conveying chamber 2, 2' is in particular a cylindrical filter element 5.

Each powder conveying chamber 2, 2' has a powder inlet with a powder inlet valve 6 and a powder outlet with a powder outlet valve 7. The respective powder inlet valves 6 are also referred to as "first valves" or "suction-side valves" in the following. The powder outlet valves 7 are also referred to as "second valves" or "conveyance-side valves."

The respective suction-side and conveyance-side end regions of the main body regions of the powder conveying chambers 2, 2' have a transition region which is designed to reduce an effective sectional area of flow of the powder conveying chamber 2, 2' to an effective sectional area of flow of the respective connected powder line 9 or to reduce the effective sectional area of flow of the valve 6, 7 arranged between the powder conveying chamber 2, 2' and the powder line 9 respectively. The transition region is thereby in particular at least in part implemented as a conical region.

The transition regions serve to adapt/reduce the nominal width of the main body region 3 of the powder conveying chamber 2, 2'; i.e. the inner diameter of the main body region 3 of the powder conveying chamber 2, 2', to the nominal width of the respective connected powder line 9 or the nominal width of the intervening valve 6, 7 respectively.

The transition regions comprise an in particular conical filter end piece 10 accommodated in a pinch valve housing 11.

A vacuum (negative pressure) is generated in one of the powder conveying chambers 2, 2' of the dense phase powder pump 1 during a suction process. The negative pressure draws the powder to be conveyed, in particular coating powder, into the powder conveying chamber 2, 2' via the corresponding powder inlet. The fine-porous filter element 5 in the main body region 3 of the powder conveying chamber 2, 2' separates the powder. During the suction process, the powder conveying chamber 2, 2' is closed on the respective suction side or conveyance side by the corresponding conveyance-side valve.

During the conveying process, on the other hand, the suction-side valve 6 on the powder inlet side of the powder conveying chamber 2, 2' is closed while the conveyance-side valve 7 is opened. The coating powder previously drawn into the powder conveying chamber 2, 2' during the suction process is then forced out of the powder conveying chamber 2, 2' and conveyed further by the positive pressure built up with the compressed air through the fine-porous filter element 5 of the main body region 3 of the powder conveying chamber 2, 2'.

The suction and conveying process alternates between the two parallelly arranged powder conveying chambers 2, 2'. In other words, the two parallelly arranged powder conveying chambers 2, 2' operate in phase opposition.

FIG. 1 shows the structure of a dense phase powder pump 1 having two parallelly arranged powder conveying chambers 2, 2' according to an exemplary embodiment of the present disclosure in an isometric view. The dense phase powder pump 1 has two powder conveying chambers 2, 2', wherein each of the two powder conveying chambers 2, 2' exhibits a cylindrical main body region 3 having a cylindrical and in particular circular cylindrical casing tube 4 and a gas-permeable filter element 5 arranged inside the casing tube 4. The filter element 5 is preferably a rigid body made from sintered material, preferably sintered metal, e.g. bronze or aluminum, or from sintered plastic or a sintered material mixture.

Figure 2:
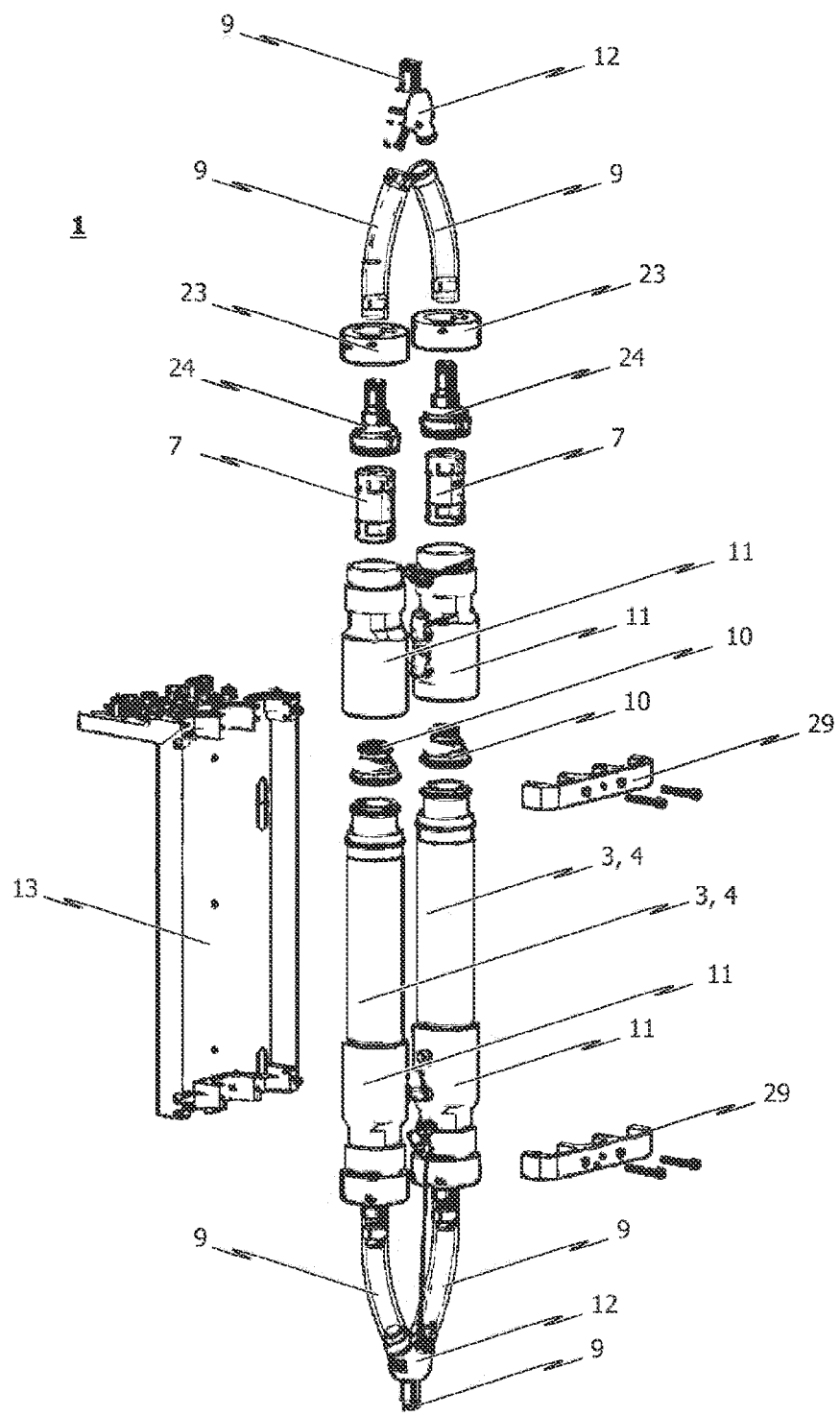
FIG. 2 a schematic and exploded view of the exemplary embodiment of the disclosed dense phase powder pump shown in FIG. 1.

As can be seen in particular from the exploded view shown in FIG. 2, the main body region 3 of each powder conveying chamber 2, 2' has a transition region at the suction and conveyance sides which is detachably connected or connectable to the main body region 3 and a part of the powder conveying chamber 2, 2'. The transition region thereby serves to adapt/reduce the nominal width of the main body region 3 of the powder conveying chamber 2, 2' to the nominal width of a suction-side or conveyance-side valve 6, 7.

In order to accordingly reduce the nominal width; i.e. the inner diameter of the cylindrical main body region 3 of the powder conveying chamber 2, 2', to the (reduced) nominal width of the corresponding valve 6, 7 or corresponding powder line 9 respectively, each transition region has a filter end piece 10 which in particular tapers conically in the direction of the valve 6, 7 or the flow line.

The filter end piece 10 is—as is the filter element 5 of the main body region 3—preferably a rigid body made in particular from sintered material, preferably sintered metal, e.g. bronze or aluminum, or from sintered plastic or a sintered material mixture. Of course, other embodiments for the filter element 10 of the transition region conically tapering in the direction of the respective valve 6, 7 are also conceivable.

The filter end piece 10 conically tapering in the direction of the respective valve 6, 7 defines the effective sectional area of flow of the transition region in order to accordingly adapt the nominal width of the main body region 3 of the powder conveying chamber 2, 2' to the nominal width of the valve 6, 7 connected to the respective end region of the powder conveying chamber 2, 2'.

As can be seen from the exploded view in FIG. 2, the respective conically tapering filter end piece 10 of the transition region is detachably connected to the corresponding end region of the main body region 3 of the powder conveying chamber 2, 2', in particular can be connected by means of a screw coupling or other releasable connection, for example using a bayonet coupling or fixable plug connection.

Each transition region further comprises a corresponding pinch valve housing 11 in which the conically tapering filter end piece 10 can be accommodated. An air gap is formed between the interior of the pinch valve housing 11 and the exterior of the conically tapering filter element 10 which is able to be pressurized as needed via a corresponding air line.

A first pinch valve 6 connected to the suction-side end region of the powder conveying chamber 2, 2' is provided at the powder inlet of each powder conveying chamber 2, 2' of the dense phase powder pump 1 shown schematically in FIG. 1 and FIG. 2. A second pinch valve 7 is connected to the respective conveyance-side end region of the powder conveying chamber 2, 2'; i.e. to the conveyance-side end region of the transition region of the powder conveying chamber 2, 2'.

In the depicted embodiment, supply line branches of a Y-connector 12 connect the powder inlet side of the two first (suction-side) valves 6 to a powder supply line 9 leading to, for example, a container of powder (not depicted in the drawings). Hose couplings are thereby used to connect the powder inlet side of the two first valves 6 (pinch valves) to the supply line branches of the Y-connector 12.

However, it is also conceivable for the respective powder inlet sides of the first (suction side) valves/pinch valves 6 to be fluidly connected to one or two different powder containers via separate powder supply lines instead of a Y-connector 12.

In the embodiment as depicted, dispensing line branches, e.g. likewise a Y-shaped line connector 12, connect the powder outlets of the two second (conveyance side) valve/pinch valves 7 to one end of a powder dispensing hose 9, the other end of which opens into a further (not depicted) container of powder. While the powder dispensing line can be a rigid tubing, it is preferably a flexible hose.

In the embodiment depicted in FIG. 1 and FIG. 2, each of the powder conveying chambers 2, 2' are accommodated and fixed in a mounting 13. The powder conveying chambers 2, 2' are in particular connected to the mounting 13 by means of a disengageable screw or bayonet coupling.

In the exemplary embodiment of the disclosed dense phase powder pump 1 shown in the drawings, each first and second valve 6, 7 is designed as a pinch valve, whereby each pinch valve 6, 7 is allocated an elastically deformable valve element 14 which is arranged within a corresponding pinch valve housing 11 such that the inlet of the pinch valve 6, 7 can be brought into fluid communication with the outlet of the pinch valve 6, 7 by the valve element formed as an elastically deformable valve element 14.

The pinch valve housing 11 has a connection 17 in order to supply compressed air as needed into the space formed between the inner wall of the pinch valve housing 11 and the valve element 14 arranged inside the pinch valve housing 11. Upon compressed air being supplied, the valve element 14 is elastically deformed so as to interrupt the fluid communication between the inlet and the outlet of the pinch valve 6, 7. However, when there is no compressed air in the gap between the inner wall of the pinch valve housing 11 and the valve element 14 arranged inside the pinch valve housing 11, the previously elastically deformed valve element 14 returns to its initial state with the inlet and the outlet of the pinch valve housing 11 being in fluid communication.

A vacuum connection can also be connected via the at least one connection of the pinch valve 6, 7 for evacuating the compressed air previously introduced into the gap in order to rapidly open the pinch valve.

Each pinch valve 6, 7 comprises an at least partly tubular valve element 14, its peripheral wall able to be squeezed transversely to the valve element's longitudinal axis in order to change the sectional area of flow.

Each pinch valve 6, 7 further comprises an at least substantially tubular support structure 19 in which the valve element 14 is at least partially accommodated. The support structure 19 consists of two shell elements of arcuate cross section circumferentially aligned one after the other around the peripheral wall of the valve element 14 which are radially attached to the outside of the valve element 14 with respect to the valve element's longitudinal axis.

Both shell elements of the support structure 19 exhibit an arcuate extension of 180°. Furthermore, the two shell elements have first and second latching means by means of which the two shell elements can be connected together in a positive and in particular releasable fit to form the support structure 19.

The support structure 19 has in particular slotted openings through which compressed air can act as a squeezing means on the peripheral wall of the valve element 14, at least in the connected state of the shell elements, in order to squeeze the peripheral wall of the valve element 14 together to reduce the given sectional area of flow.

Returning to the FIG. 1, FIG. 2 and FIG. 3 depictions, it is to be noted that the dense phase powder pump 1 comprises a pinch valve housing 11 arranged at the respective end regions of the powder conveying chamber 2, 2' which is or is able to be detachably connected to the corresponding end region of the powder conveying chamber 2, 2'. The respective pinch valve housing 11 is designed to replaceably accommodate the pinch valve 6, 7 implemented as a cartridge-like or canister-like component.

Figure 3:
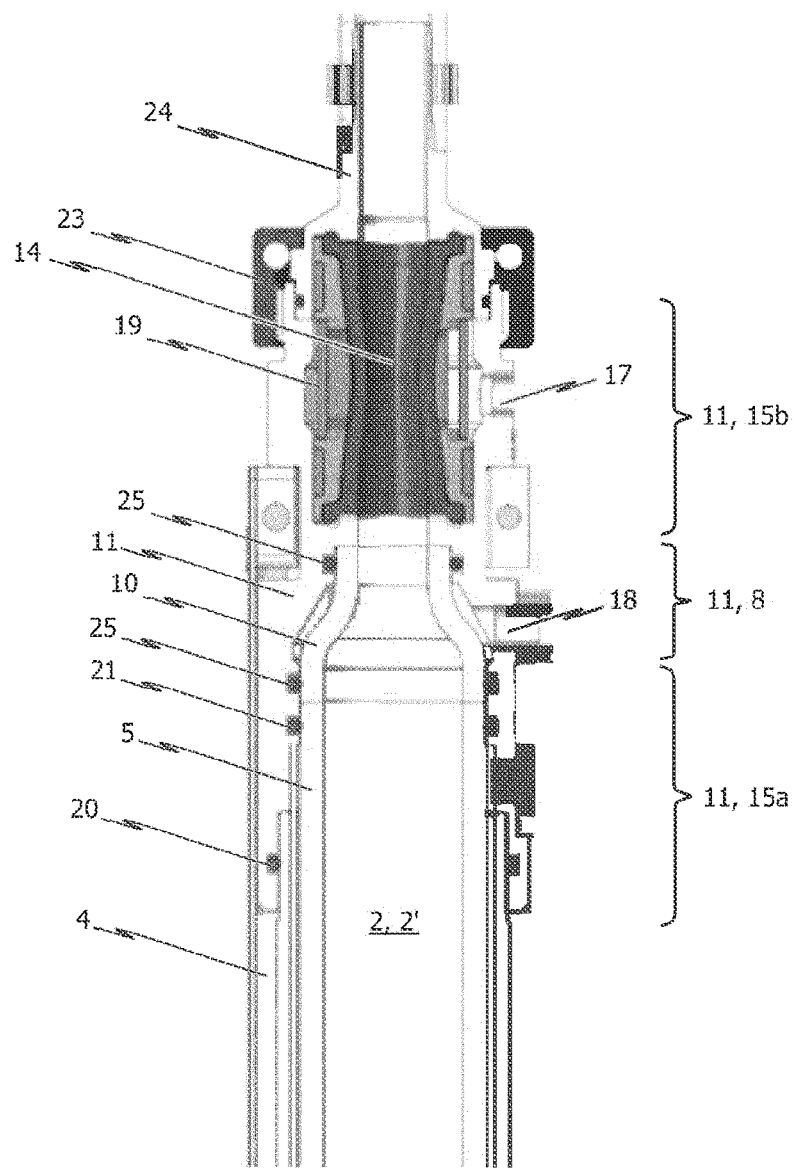
FIG. 3 a schematic and sectional view of an end region of the powder conveying chamber of the dense phase powder pump according to FIG. 1.

It can be seen from the sectional view in FIG. 3 that the pinch valve housing 11 has a region for the in particular replaceable accommodation of the pinch valve 6, 7 and an oppositely disposed region via which the pinch valve housing 11 is connectable to, in particular can plug into, the casing body 4 of the powder conveying chamber 2, 2'. The pinch valve housing 11 is in particular a component able to be detachably or replaceably connected to the casing body 4 of the powder conveying chamber 2, 2'.

The second region 15b of the pinch valve housing 11 is designed to accommodate an end region of the filter element 5 of the powder conveying chamber 2, 2'.

In the exemplary embodiment of the disclosed dense phase powder pump 1 depicted in the drawings, it is specifically provided for the support structure 19 of the pinch valve 6, 7 to have a radial and mean outer diameter vis-à-vis the valve element longitudinal axis which at least substantially corresponds to the radial and mean inner diameter of the filter element 5 vis-à-vis the valve element longitudinal axis, wherein the mean outer diameter of the support structure 19 preferably differs from the mean inner diameter of the filter element by less than 10% and even more preferentially by less than 5%.

The pinch valve 6, 7 is in particular designed as a cartridge or canister component which is or is able to be replaceably accommodated as such in a pinch valve housing 11 of the dense phase powder pump 1. The pinch valve housing 11 encloses an accommodating space. The pinch valve housing 11 preferentially has a first tubular region 15a and a second region 15b connected to the first region 15a via a fluid channel or powder conveying channel. The pinch valve housing 11 is detachably connected to the powder conveying chamber 2, 2'. It is provided with a fluid connection formed by an axial passageway. Pressurizing means controlling the pinch valve 6, 7 can be introduced via the fluid connection.

As can be noted particularly from the sectional view in FIG. 3, the dense phase powder pump 1 has a pinch valve housing 11 for each pinch valve 6, 7 which is designed as an end piece of the powder conveying chamber 2, 2'.

The detachable pinch valve housing 11 implemented separately from the casing body 4 of the powder conveying chamber 2, 2' has a first region 15a facing the powder conveying chamber 2, 2' and an oppositely disposed second region 15b. The first region 15a of the pinch valve housing 11 is designed to be connectable to the end region of the powder conveying chamber 2, 2' via a plug connection, whereby the second region 15b of the pinch valve housing 11 is on the other hand designed to replaceably accommodate the pinch valve 6, 7.

With the exemplary embodiment of the disclosed dense phase powder pump 1 shown in the drawings, it is provided for the filter element 5 of the powder conveying chamber 2, 2' to extend beyond the end region of the casing body 4 at the end region of the powder conveying chamber 2, 2'. Thereby in particular provided—as indicated in FIG. 3—is for the first region 15a of the pinch valve housing 11 to be designed to accommodate the region of the filter element 5 extending beyond the end region of the casing body 4.

The first region 15a of the pinch valve housing 11 has a first section facing the casing body 4 and an oppositely disposed second section. The first section of the pinch valve housing 11 and the end region of the casing body 4 of the powder conveying chamber 2, 2' are thereby designed to form a releasable plug connection between the pinch valve housing 11 and the casing body 4.

Specifically provided with the embodiment shown in the drawings is for the end region of the casing body 4 to be designed as a spigot for the connection at the first section of the pinch valve housing 11.

Further to be noted from the sectional view according to FIG. 3 is that a stop is provided which is designed to limit movement of the pinch valve housing 11 relative to the casing body 4 of the powder conveying chamber 2, 2' in the mating direction. The stop is thereby formed by a first abutment surface formed at the end region of the casing body 4 and second abutment surface formed at the first region 15a of the pinch valve housing 11. After the plug connection being made between the pinch valve housing 11 and the end region of the powder conveying chamber 2, 2', the second abutment surface preferably tightly seals against the first abutment surface.

Further to be noted from the FIG. 3 illustration is that an elastic sealing means in the form of an O-ring is provided between the first section of the pinch valve housing 11 and the end region of the casing body 4.

On the other hand, the second section of the pinch valve housing 11 is designed to accommodate a region of the filter element 5 extending beyond the end region of the casing body 4, whereby elastic sealing means 21 likewise in the form of an O-ring is provided between the second section of the pinch valve housing 11 and the region of the filter element 5 extending over the end region of the casing body 4.

As FIG. 2 depicts, a releasable securing element 29, e.g. in the form of a retaining clip, can be provided in order to fix the pinch valve housing 11 with the inserted casing body 4 of the dense phase powder pump 1 to a mounting 13 of the dense phase powder pump 1, and thus releasably secure the plug connection between the pinch valve housing 11 and the casing body 4 of the powder conveying chamber 2, 2'.

The pinch valve 6, 7—as already noted—is preferably implemented as a cartridge-like or canister-like component and comprises an at least partly tubular valve element 14, its peripheral wall able to be squeezed transversely to the valve element's longitudinal axis in order to change the sectional area of flow. The pinch valve 6, 7 moreover preferably comprises an in particular at least substantially tubular support structure 19 in which the (tubular) valve element 14 is at least in part, and in particular replaceably, accommodated.

The cartridge-like or canister-like pinch valve 6, 7 can be inserted into the second region 15b of the pinch valve housing 11, wherein an in particular annular pressure chamber able to be pressurized with compressed air is formed between the pinch valve 6, 7 and an inner wall area of the second region 15b of the pinch valve housing 11 in the inserted state. It is thereby provided for the pinch valve housing 11 to have a compressed air connection 17 through which compressed air can be supplied to the pressure chamber as necessary in order to manipulate the relevant pinch valve 6, 7 or the tubular valve element 14 of the pinch valve 6, 7 respectively.

An interface in the form of an external threaded section is formed on one end section of the region second 15b of the pinch valve housing 11 opposite from the powder conveying chamber 2, 2' by means of which the second region 15b of the pinch valve housing 11 can be detachably connected to a powder line 9.

Particularly provided in the embodiment depicted in the drawings is for a hose connector 24 to be releasably connectable to the second region 15b of the pinch valve housing 11 by means of a union nut 23.

As can be seen from the sectional view in FIG. 3, the pinch valve housing 11 comprises transition region 8 formed between its first region 15a and its second region 15b which is designed to at least partly reduce an effective sectional area of flow of the powder conveying chamber 2, 2', as dictated by the cross section of the filter element 5, to an effective sectional area of flow of the pinch valve 6, 7 in its opened state. The transition region 8 is thereby in particular at least in part implemented as a funnel-shaped or conical region.

In the exemplary embodiment of the disclosed dense phase powder pump 1 as depicted, the transition region 8 of the pinch valve housing 11 is designed to at least in part accommodate a conical and gas-permeable filter end piece 10 of the powder conveying chamber 2, 2', wherein the filter end piece 10 is in particular realized as a separate component from the filter element 5 of the powder conveying chamber 2, 2'. In particular, the filter end piece 10 can plug into the transition region 8 of the pinch valve housing 11 via the second region 15b of the pinch valve housing 11.

Sealing means 25, particularly in the form of O-rings, are further provided here as well such that when the filter end piece 10 is accommodated and in particular in inserted state in the transition region 8 of the pinch valve housing 11, it is sealed relative to the second region 15b of the pinch valve housing 11 and relative to an in particular annular gap area formed between the casing body 4 and the filter element 5.

An in particular annular gap area is formed between an inner wall area of the transition region 8 of the pinch valve housing 11 and the filter end piece 10 when the filter end piece 10 is accommodated and in particular in inserted state in the transition region 8 of the pinch valve housing 11, which can be pressurized with compressed air as necessary via a compressed air connection 17 of the pinch valve housing 11, particularly so as to keep the end region of the powder conveying chamber 2, 2' free of powder deposits or to remove deposits of powder at the end region of the powder conveying chamber 2, 2'.

FIG. 4a to FIG. 4h shows how the pinch valves 6, 7 or the filter element 5 can be dismantled or changed in the exemplary embodiment of the dense phase powder pump 1 according to the present disclosure.

To do so—as indicated in FIG. 4a—first a housing shell 27 of the two parallelly arranged powder conveying chambers 2, 2' is removed. This preferably ensues by disengaging a quick-release fastener.

Subsequently—as indicated in FIG. 4b—the controller 28 is separated from the powder conveying chambers 2, 2'.

The respective retaining clips 29 connecting the powder conveying chambers 2, 2' to the mounting 13 of the dense phase powder pump 1 are then disengaged. As indicated in FIG. 4c and FIG. 4d, the powder conveying chambers 2, 2' are then separated from the mounting 13.

All that is required to replace the pinch valves 6, 7 is disengaging the interface between the pinch valve housing 11 and the powder line 9. The interface is preferably formed by a union nut 23 such that the hose connector 24 can be removed from the second region 15b of the pinch valve housing 11 by loosening the union nut 23 (see FIG. 4e).

Figure 4E:
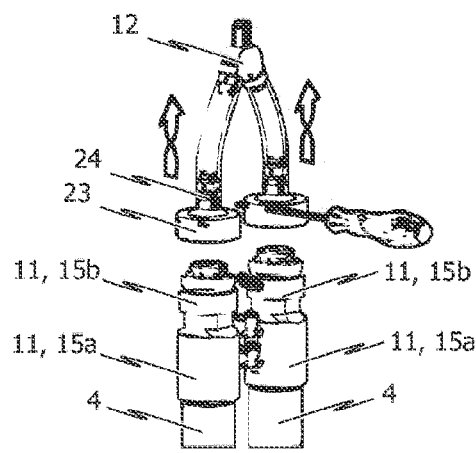
Figure 4F:
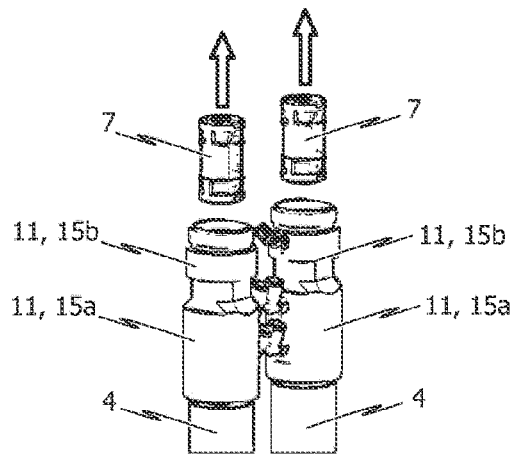

The in particular cartridge-like or canister-like pinch valve 6, 7 can then be removed from the second region 15b of the pinch valve housing 11, as shown in FIG. 4f.

Figure 4G:
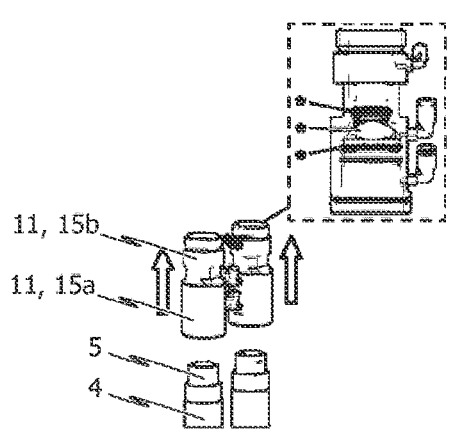
Figure 4H:
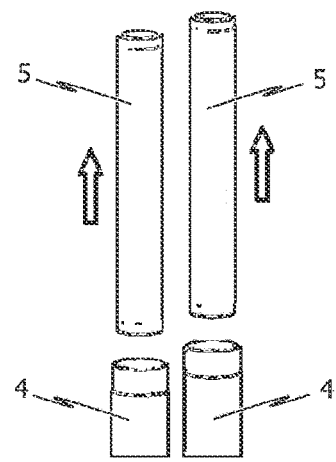

All that is required to also replace the filter elements 5 of the powder conveying chambers 2, 2' is pulling the pinch valve housing 11 out of the end regions of the powder conveying chambers 2, 2', as indicated in FIG. 4g. The filter elements 5 of the powder conveying chambers 2, 2' can then be removed (see. FIG. 4h).

The present disclosure is not limited to the embodiments depicted in the drawings but rather yields from an integrated overall consideration of all the features as disclosed herein.

LIST OF REFERENCE NUMERALS 1 dense phase powder pump
2, 2' powder conveying chamber
3 main body region
4 casing tube/casing body
filter element
6 powder inlet valve/pinch valve
7 powder outlet valve/pinch valve
8 transition region of pinch valve
9 powder line
conical filter end piece
11 pinch valve housing
12 Y-connector
13 mounting
14 valve element (pinch valve)
15a first region of pinch valve housing
15b second region of pinch valve housing
17 compressed air connection on pinch valve housing
18 compressed air connection on pinch valve housing
19 support structure
20 first sealing means
21 second sealing means
23 union nut
24 hose connector
25 third sealing means
27 housing shell
28 controller
29 retaining clip

The invention claimed is:

1. A dense phase powder pump for conveying powder, wherein the dense phase powder pump comprises at least one powder conveying chamber having a gas-permeable filter element at least partially accommodated in a casing body and at least one pinch valve connected or connectable to an end region of the powder conveying chamber,
wherein:
the dense phase powder pump comprises a pinch valve housing designed as an end piece of the powder conveying chamber which has a first region facing the powder conveying chamber and an oppositely disposed second region, wherein the first region of the pinch valve housing is designed to be connectable to the end region of the powder conveying chamber via a plug connection, and wherein the second region of the pinch valve housing is designed to replaceably accommodate the pinch valve.

2. The dense phase powder pump according to claim 1, wherein the filter element has a region that extends beyond an end region of the casing body at the end region of the powder chamber, and wherein the first region of the pinch valve housing is designed to accommodate the region of the filter element extending beyond the end region of the casing body.

3. The dense phase powder pump according to claim 1, wherein the first region of the pinch valve housing comprises a first section facing the casing body and an oppositely disposed second section, wherein the first section of the pinch valve housing and an end region of the casing body are designed to form a disengageable plug connection between the pinch valve housing and the casing body.

4. The dense phase powder pump according to claim 3, wherein the first section of the pinch valve housing is designed as a spigot for the connection at the end region of the casing body; or
wherein the end region of the casing body is designed as a spigot for the connection at the first section of the pinch valve housing.

5. The dense phase powder pump according to claim 3, wherein at least one stop is provided which is designed to limit movement of the pinch valve housing relative to the casing body of the powder conveying chamber in a mating direction, wherein the at least one stop is formed by a first abutment surface formed at the end region of the casing body and a second abutment surface formed at the first region of the pinch valve housing, wherein upon the plug connection being made between the pinch valve housing and the end region of the powder conveying chamber, the second abutment surface tightly seals against the first abutment surface.

6. The dense phase powder pump according to claim 3, wherein elastic sealing means, in the form of an O-ring, is provided between the first section of the pinch valve housing and the end region of the casing body.

7. The dense phase powder pump according to claim 3, wherein the second section of the pinch valve housing is designed to accommodate a region of the filter element extending beyond the end region of the casing body, wherein elastic sealing means, in the form of an O-ring, is provided between the second section of the pinch valve housing and the region of the filter element extending beyond the end region of the casing body.

8. The dense phase powder pump according to claim 1, wherein a releasable securing element, in the form of a retaining clip, is provided for releasably fixing the pinch valve housing with the inserted powder conveying chamber to a mounting of the dense phase powder pump.

9. The dense phase powder pump according to claim 1, wherein the pinch valve is implemented as a cartridge or canister component and comprises an at least partly tubular valve element, a peripheral wall thereof being able to be squeezed transversely to a longitudinal axis of the valve element in order to change a sectional area of flow, and further comprises an at least substantially tubular support structure in which the valve element is at least in part and replaceably accommodated.

10. The dense phase powder pump according to claim 1, wherein the pinch valve can be inserted into the second region of the pinch valve housing, wherein an annular pressure chamber able to be pressurized with compressed air is formed between the pinch valve and an inner wall area of the second region of the pinch valve housing in an inserted state.

11. The dense phase powder pump according to claim 10, wherein the pinch valve housing has at least one compressed air connection through which compressed air can be supplied to the pressure chamber as necessary.

12. The dense phase powder pump according to claim 10, wherein a stop is provided in order to limit movement of the pinch valve relative to the pinch valve housing in a mating direction, wherein the stop is formed by a first abutment surface of the pinch valve housing and a second abutment surface of the pinch valve, wherein the second abutment surface tightly seals against the first abutment surface in the inserted state.

13. The dense phase powder pump according to claim 1, wherein an interface is formed on an end section of the second region of the pinch valve housing opposite from the powder conveying chamber by means of which the second region of the pinch valve housing can be detachably connected to a powder line, wherein the interface is designed and implemented as a threaded section, so as to receive a union nut for detachably connecting a hose connector to the second region of the pinch valve housing.

14. The dense phase powder pump according to claim 1, wherein the pinch valve housing comprises a transition region formed between its first region and its second region which is designed to at least partly reduce an effective sectional area of flow of the powder conveying chamber as dictated by the cross section of the filter element to an effective sectional area of flow of the pinch valve in its opened state, wherein the transition region is at least in part implemented as a funnel-shaped or conical region.

15. The dense phase powder pump according to claim 14, wherein the transition region of the pinch valve housing is designed to at least partially accommodate an at least partly conical and gas-permeable filter end piece of the powder conveying chamber, wherein the filter end piece is realized as a separate component from the filter element of the powder conveying chamber.

16. The dense phase powder pump according to claim 15, wherein the filter end piece can plug into the transition region of the pinch valve housing by way of the second region of the pinch valve housing.

17. The dense phase powder pump according to claim 15, wherein sealing means, in the form of O-rings, are provided such that when the filter end piece is accommodated in an inserted state in the transition region of the pinch valve housing, it is sealed relative to the second region of the pinch valve housing and relative to an annular gap area formed between the casing body and the filter element.

18. The dense phase powder pump according to claim 15, wherein an annular gap area is formed between an inner wall area of the transition region of the pinch valve housing and the filter end piece when the filter end piece is accommodated in an inserted state in the transition region of the pinch valve housing which can be pressurized with compressed air when necessary via a compressed air connection of the pinch valve housing, so as to keep the end region of the powder conveying chamber free of powder deposits or to remove deposits of powder at the end region.

* * * * *